(12) United States Patent
Isshiki

(10) Patent No.: US 12,107,270 B2
(45) Date of Patent: Oct. 1, 2024

(54) SLURRY COMPOSITION FOR LITHIUM ION SECONDARY BATTERY AND ELECTRODE FOR LITHIUM ION SECONDARY BATTERY

(71) Applicant: ZEON CORPORATION, Tokyo (JP)

(72) Inventor: Yasuhiro Isshiki, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 472 days.

(21) Appl. No.: 16/967,134

(22) PCT Filed: Feb. 19, 2019

(86) PCT No.: PCT/JP2019/006152
§ 371 (c)(1),
(2) Date: Aug. 4, 2020

(87) PCT Pub. No.: WO2019/167730
PCT Pub. Date: Sep. 6, 2019

(65) Prior Publication Data
US 2021/0057725 A1 Feb. 25, 2021

(30) Foreign Application Priority Data
Feb. 27, 2018 (JP) ................................. 2018-033814

(51) Int. Cl.
| | | |
|---|---|---|
| *H01M 4/62* | (2006.01) |
| *C08K 3/04* | (2006.01) |
| *C08K 3/34* | (2006.01) |
| *C08L 25/10* | (2006.01) |
| *C08L 33/02* | (2006.01) |
| *C08L 33/06* | (2006.01) |
| *C08L 33/26* | (2006.01) |
| *H01M 4/131* | (2010.01) |
| *H01M 4/133* | (2010.01) |
| *H01M 4/485* | (2010.01) |
| *H01M 4/587* | (2010.01) |
| *H01M 10/0525* | (2010.01) |
| *H01M 4/02* | (2006.01) |
| *H01M 4/134* | (2010.01) |
| *H01M 4/36* | (2006.01) |
| *H01M 4/38* | (2006.01) |

(52) U.S. Cl.
CPC ............ *H01M 4/622* (2013.01); *C08K 3/04* (2013.01); *C08K 3/34* (2013.01); *C08L 25/10* (2013.01); *C08L 33/02* (2013.01); *C08L 33/064* (2013.01); *C08L 33/26* (2013.01); *H01M 4/131* (2013.01); *H01M 4/133* (2013.01); *H01M 4/485* (2013.01); *H01M 4/587* (2013.01); *H01M 4/62* (2013.01); *H01M 10/0525* (2013.01); *H01M 2004/021* (2013.01); *H01M 4/134* (2013.01); *H01M 4/362* (2013.01); *H01M 4/386* (2013.01); *H01M 4/621* (2013.01)

(58) Field of Classification Search
CPC ..... H01M 4/36–364; H01M 4/38–386; H01M 4/58–5825; H01M 4/62–622; H01M 10/0525
See application file for complete search history.

(56) References Cited

U.S. PATENT DOCUMENTS

| | | | |
|---|---|---|---|
| 6,585,873 B1 * | 7/2003 | Solomon ................ | C07C 233/38 526/261 |
| 11,552,297 B2 | 1/2023 | Sonobe et al. | |
| 2012/0070737 A1 * | 3/2012 | Son .......................... | C08J 3/246 429/217 |
| 2013/0112928 A1 * | 5/2013 | Omote ................... | H01M 4/622 524/556 |
| 2014/0079939 A1 * | 3/2014 | Hayashi ................. | C08F 2/46 264/483 |
| 2015/0030922 A1 * | 1/2015 | Kobayashi ............. | H01M 4/622 252/182.1 |

(Continued)

FOREIGN PATENT DOCUMENTS

| | | |
|---|---|---|
| CN | 103003991 A | 3/2013 |
| CN | 106463732 A | 2/2017 |

(Continued)

OTHER PUBLICATIONS

Y. Hong, Advances in Polyurethane Biomaterials Ch. 19—Electrospun fibrous polyurethane scaffolds in tissue engineering, 2016, Woodhead Publishing, p. 546 (Year: 2016).*
Sep. 16, 2021, the Extended European Search Report issued by the European Patent Office in the corresponding European Patent Application No. 19760801.1.

(Continued)

*Primary Examiner* — Laura Weiner
(74) *Attorney, Agent, or Firm* — KENJA IP LAW PC

(57) ABSTRACT

Provided is a slurry composition for a lithium ion secondary battery that can cause an electrode for a lithium ion secondary battery to display excellent adhesiveness (peel strength) and flexibility (pliability) and that can cause a lithium ion secondary battery to display excellent rate characteristics and cycle characteristics. The slurry composition for a lithium ion secondary battery contains a silicon compound and a binder. The silicon compound includes either or both of $Li_2SiO_3$ and $Li_4SiO_4$. The binder includes a water-soluble polymer that includes either or both of an ethylenically unsaturated carboxylic acid monomer unit (A) and an alkali metal salt thereof, and that includes a cross-linkable monomer unit (B). A 1 mass % aqueous solution of the water-soluble polymer has a viscosity of 1,000 mPa·s or less. The slurry composition for a lithium ion secondary battery has a pH of not lower than 9 and not higher than 12.

6 Claims, No Drawings

(56) References Cited

U.S. PATENT DOCUMENTS

| | | | |
|---|---|---|---|
| 2015/0287989 A1* | 10/2015 | Hirose | H01M 4/622 |
| | | | 429/217 |
| 2017/0062828 A1* | 3/2017 | Sonobe | H01M 10/0566 |
| 2017/0117543 A1* | 4/2017 | Park | H01M 4/131 |
| 2017/0352886 A1 | 12/2017 | Matsuzaki et al. | |
| 2018/0215852 A1* | 8/2018 | Fonnum | C08F 120/54 |
| 2018/0261833 A1 | 9/2018 | Hirose et al. | |
| 2019/0097223 A1 | 3/2019 | Hirose et al. | |
| 2021/0057725 A1* | 2/2021 | Isshiki | H01M 4/134 |

FOREIGN PATENT DOCUMENTS

| | | | | |
|---|---|---|---|---|
| JP | 2012204303 A | 10/2012 | | |
| JP | 6150031 B1 | 6/2017 | | |
| JP | 2017097952 A | 6/2017 | | |
| KR | 1020130042558 A | 4/2013 | | |
| WO | WO-2015186363 A1 * | 12/2015 | | C08L 33/02 |
| WO | 2017013138 A1 | 1/2017 | | |
| WO | 2017061073 A1 | 4/2017 | | |

Aug. 27, 2020, International Preliminary Report on Patentability issued in the International Patent Application No. PCT/JP2019/006152.

* cited by examiner

SLURRY COMPOSITION FOR LITHIUM ION SECONDARY BATTERY AND ELECTRODE FOR LITHIUM ION SECONDARY BATTERY

TECHNICAL FIELD

The present disclosure relates to a slurry composition for a lithium ion secondary battery and an electrode for a lithium ion secondary battery.

BACKGROUND

Lithium ion secondary batteries have characteristics such as compact size, light weight, high energy-density, and the ability to be repeatedly charged and discharged, and are used in a wide variety of applications. Consequently, in recent years, studies have been made to improve battery members such as electrodes for the purpose of achieving even higher lithium ion secondary battery performance.

Specifically, studies have been carried out in relation to increasing battery capacity of a lithium ion secondary battery through an electrode (lithium ion secondary battery silicon-based negative electrode) in which a silicon-based electrode active material is adopted as an electrode active material (for example, refer to Patent Literature (PTL) 1).

It is desirable for a lithium ion secondary battery in which a silicon-based electrode active material is used to have battery characteristics of a similar level to those of a lithium ion secondary battery in which a carbon material is used. For this reason, cycle characteristics and the like of batteries have been improved by using a silicon compound ($SiO_x$: $0.5 \leq x \leq 1.6$) that includes a Li compound as an electrode active material (for example, refer to PTL 2).

CITATION LIST

Patent Literature

PTL 1: Specification of JP6150031B
PTL 2: WO2017/061073A1

SUMMARY

Technical Problem

However, a slurry composition for a lithium ion secondary battery that is advantageous in industrial production of a secondary battery has not yet been proposed for a case in which a silicon compound ($SiO_x$: $0.5 \leq x \leq 1.6$) including a Li compound is used because a slurry composition becomes alkaline and slurry stability is poor in such a case. Moreover, there is room for improvement in terms of adhesiveness (peel strength) and flexibility (pliability) of an electrode for a lithium ion secondary battery and in terms of rate characteristics and cycle characteristics of a lithium ion secondary battery.

Accordingly, one object of the present disclosure is to provide a slurry composition for a lithium ion secondary battery that can cause an electrode for a lithium ion secondary battery to display excellent adhesiveness (peel strength) and flexibility (pliability) and that can cause a lithium ion secondary battery to display excellent rate characteristics and cycle characteristics.

Another object of the present disclosure is to provide an electrode for a lithium ion secondary battery that can display excellent adhesiveness (peel strength) and flexibility (pliability) and that can cause a lithium ion secondary battery to display excellent rate characteristics and cycle characteristics.

Solution to Problem

The inventor conducted diligent investigation with the aim of solving the problems set forth above. The inventor discovered that by using a slurry composition for a lithium ion secondary battery that contains a silicon compound including either or both of $Li_2SiO_3$ and $Li_4SiO_4$ and a binder including a specific water-soluble polymer, and that has a pH of not lower than 9 and not higher than 12, it is possible impart excellent adhesiveness (peel strength) and flexibility (pliability) to an electrode for a lithium ion secondary battery and to impart excellent rate characteristics and cycle characteristics to a lithium ion secondary battery. In this manner, the inventor completed the present disclosure.

Specifically, the present disclosure aims to advantageously solve the problems set forth above, and a presently disclosed slurry composition for a lithium ion secondary battery comprises a silicon compound and a binder, wherein the silicon compound includes either or both of $Li_2SiO_3$ and $Li_4SiO_4$, the binder includes a water-soluble polymer, the water-soluble polymer includes either or both of an ethylenically unsaturated carboxylic acid monomer unit (A) and an alkali metal salt thereof, and includes a cross-linkable monomer unit (B), a 1 mass % aqueous solution of the water-soluble polymer has a viscosity of 1,000 mPa·s or less, and the slurry composition for a lithium ion secondary battery has a pH of not lower than 9 and not higher than 12. The inventor discovered that by producing an electrode for a lithium ion secondary battery using a slurry composition for a lithium ion secondary battery that contains a silicon compound and a binder, in which the silicon compound includes either or both of $Li_2SiO_3$ and $Li_4SiO_4$, the binder includes a water-soluble polymer, the water-soluble polymer includes either or both of an ethylenically unsaturated carboxylic acid monomer unit (A) and an alkali metal salt thereof, and includes a cross-linkable monomer unit (B), and a 1 mass % aqueous solution of the water-soluble polymer has a viscosity of 1,000 mPa·s or less, and that has a pH of not lower than 9 and not higher than 12 in this manner, excellent adhesiveness (peel strength) and flexibility (pliability) can be imparted to the electrode for a lithium ion secondary battery, and excellent rate characteristics and cycle characteristics can be imparted to a lithium ion secondary battery, and, in this manner, the inventor completed the present disclosure.

As used in the present disclosure, the phrase "includes a monomer unit" means that "a polymer obtained with the monomer includes a structural unit derived from the monomer".

Moreover, the viscosity of a 1 mass % aqueous solution of a water-soluble polymer is measured using a rotary rheometer and, more specifically, can be measured by a method described in the EXAMPLES section of the present specification.

Moreover, the term "water-soluble" as used in the present specification means that when 0.5 g (in terms of solid content) of a polymer is dissolved in 100 g of water, insoluble content is 10 mass % or less, whereas the term "water-insoluble" means that when 0.5 g (in terms of solid content) of a polymer is dissolved in 100 g of water, insoluble content is more than 10 mass %.

In the presently disclosed slurry composition for a lithium ion secondary battery, the binder preferably further includes carboxymethyl cellulose. This is because adhesiveness (peel strength) of an electrode for a lithium ion secondary battery can be further improved when the binder further includes carboxymethyl cellulose.

In the presently disclosed slurry composition for a lithium ion secondary battery, the water-soluble polymer preferably has a weight-average molecular weight of not less than 300,000 and not more than 15,000,000. This is because flexibility (pliability) of an electrode for a lithium ion secondary battery can be further improved and cycle characteristics of a lithium ion secondary battery can be further improved when the weight-average molecular weight of the water-soluble polymer is not less than 300,000 and not more than 15,000,000.

In the presently disclosed slurry composition for a lithium ion secondary battery, it is preferable that the water-soluble polymer further includes an ethylenically unsaturated monomer unit (C), and the ethylenically unsaturated monomer unit (C) is formed from an ethylenically unsaturated monomer having a solubility of 7 g or more per 100 g of water at 20° C. This is because adhesiveness (peel strength) of an electrode for a lithium ion secondary battery can be further improved when the water-soluble polymer includes an ethylenically unsaturated monomer unit (C) of a specific ethylenically unsaturated monomer.

In the presently disclosed slurry composition for a lithium ion secondary battery, the water-soluble polymer preferably has a degree of swelling in electrolyte solution of less than 120%. This is because rate characteristics and cycle characteristics of a lithium ion secondary battery can be further improved when the degree of swelling in electrolyte solution of the water-soluble polymer is less than 120%.

In the presently disclosed slurry composition for a lithium ion secondary battery, the cross-linkable monomer unit (B) preferably includes a (meth)acryloyl group. This is because adhesiveness (peel strength) of an electrode for a lithium ion secondary battery can be further improved and rate characteristics of a lithium ion secondary battery can be further improved when the cross-linkable monomer unit (B) includes a (meth)acryloyl group.

In the presently disclosed slurry composition for a lithium ion secondary battery, the cross-linkable monomer unit (B) is preferably a polyfunctional polymerizable monomer unit including 2 to 6 polymerizable unsaturated groups. This is because adhesiveness (peel strength) and flexibility (pliability) of an electrode for a lithium ion secondary battery can be further improved and cycle characteristics of a lithium ion secondary battery can be further improved when the cross-linkable monomer unit (B) is a polyfunctional polymerizable monomer unit including 2 to 6 polymerizable unsaturated groups.

In the presently disclosed slurry composition for a lithium ion secondary battery, it is preferable that the binder further includes a water-insoluble conjugated diene copolymer, and the water-insoluble conjugated diene copolymer includes a conjugated diene monomer unit, an aromatic vinyl monomer unit, and an ethylenically unsaturated carboxylic acid monomer unit, and has a glass-transition temperature of 0° C. or higher. This is because adhesiveness (peel strength) of an electrode for a lithium ion secondary battery can be further improved and cycle characteristics of a lithium ion secondary battery can be further improved when the binder further includes a specific water-insoluble conjugated diene copolymer.

The presently disclosed slurry composition for a lithium ion secondary battery preferably further comprises a carbon-based active material. This is because cycle characteristics of a lithium ion secondary battery can be further improved when the slurry composition further contains a carbon-based active material.

Moreover, the present disclosure aims to advantageously solve the problems set forth above, and a presently disclosed electrode for a lithium ion secondary battery comprises an electrode mixed material layer formed using any one of the slurry compositions for a lithium ion secondary battery set forth above. By using any one of the presently disclosed slurry compositions for a lithium ion secondary battery set forth above, the electrode for a lithium ion secondary battery can display excellent adhesiveness (peel strength) and flexibility (pliability) and can cause a lithium ion secondary battery to display excellent rate characteristics and cycle characteristics.

Advantageous Effect

According to the present disclosure, it is possible to provide a slurry composition for a lithium ion secondary battery that can cause an electrode for a lithium ion secondary battery to display excellent adhesiveness (peel strength) and flexibility (pliability) and that can cause a lithium ion secondary battery to display excellent rate characteristics and cycle characteristics.

Moreover, according to the present disclosure, it is possible to provide an electrode for a lithium ion secondary battery that can display excellent adhesiveness (peel strength) and flexibility (pliability) and that can cause a lithium ion secondary battery to display excellent rate characteristics and cycle characteristics.

DETAILED DESCRIPTION

The following provides a detailed description of embodiments of the present disclosure.

A presently disclosed slurry composition for a lithium ion secondary battery is used in formation of an electrode of a lithium ion secondary battery in which a Li-containing silicon oxide is used as an active material. Moreover, a presently disclosed electrode for a lithium ion secondary battery includes an electrode mixed material layer formed using the presently disclosed slurry composition for a lithium ion secondary battery.

Note that in the present specification, "(meth)acryloyl group" is used to indicate "acryloyl group" and/or "methacryloyl group", whereas "(meth)acrylate" is used to indicate "acrylate" and/or "methacrylate".

(Slurry Composition for Lithium Ion Secondary Battery)

The presently disclosed slurry composition for a lithium ion secondary battery contains at least a silicon compound and a binder, and may contain a carbon-based active material, a metal-based active material, a solvent, and other components as necessary.

Although the pH of the presently disclosed slurry composition for a lithium ion secondary battery is not specifically limited so long as it is not lower than 9 and not higher than 12, the pH of the presently disclosed slurry composition for a lithium ion secondary battery is preferably 9.5 or higher, more preferably 10 or higher, and particularly preferably 10.8 or higher in terms that an electrode for a lithium ion secondary battery can be caused to display excellent adhesiveness (peel strength) and a lithium ion secondary battery can be caused to display excellent cycle characteristics, and is preferably 11.5 or lower, and more preferably 11 or lower in terms that an electrode for a lithium ion secondary battery can be caused to display excellent adhesiveness (peel strength).

Note that the pH of the slurry composition for a lithium ion secondary battery can be adjusted through addition of a known acidic compound or basic compound.

<Silicon Compound>

The silicon compound is a different compound to the subsequently described metal-based active material and is not specifically limited so long as it includes either or both of $Li_2SiO_3$ and $Li_4SiO_4$ (hereinafter, also referred to as "prescribed silicon compounds"). For example, the silicon compound may be a composite or mixture of (i) $Li_2SiO_3$ and a silicon-based material, (ii) $Li_4SiO_4$ and a silicon-based material, (iii) $Li_2SiO_3$, $Li_4SiO_4$, and a silicon-based material, or the like. Of these examples, (ii) $Li_4SiO_4$ and a silicon-based material is preferable.

The method of addition of the silicon compound is not specifically limited and may be a method in which the silicon compound is combined with the subsequently described carbon-based active material or metal-based active material and is then added or a method in which the silicon compound is added individually.

[Silicon-Based Material]

The silicon-based material may be a silicon-based negative electrode active material such as silicon (Si), a silicon-containing alloy, SiOC, $SiO_x$ (x is a value of not less than 0.2 and not more than 1.8), a composite of a silicon-containing material and conductive carbon obtained by coating or combining the Si-containing material with the conductive carbon, or the like, for example. One of these silicon-based materials may be used individually, or two or more of these silicon-based materials may be used in combination.

Of these silicon-based materials, $SiO_x$ (x is a value of not less than 0.2 and not more than 1.8) is preferable in terms that a high-capacity lithium ion secondary battery can be obtained.

Although no specific limitations are placed on the content of the silicon compound, from a viewpoint of battery capacity, the content of the silicon compound per 100 parts by mass of slurry solid content is preferably 0.5 parts by mass or more, more preferably 2 parts by mass or more, even more preferably 5 parts by mass or more, and particularly preferably 10 parts by mass or more, and is preferably 100 parts by mass or less, more preferably 50 parts by mass or less, even more preferably 30 parts by mass or less, and particularly preferably 20 parts by mass or less.

The content of the prescribed silicon compounds (total content of $Li_2SiO_3$ and $Li_4SiO_4$) in the silicon compound is not specifically limited but is preferably 1 mass % or more, more preferably 2 mass % or more, even more preferably 3 mass % or more, and particularly preferably 5 mass % or more per 100 mass % of the silicon compound from a viewpoint of battery capacity, and is preferably 15 mass % or less, more preferably 10 mass % or less, and particularly preferably 8 mass % or less per 100 mass % of the silicon compound from a viewpoint of battery capacity.

<Binder>

The binder is a component that, in an electrode produced by forming an electrode mixed material layer on a current collector using the presently disclosed slurry composition for a lithium ion secondary battery, can hold components contained in the electrode mixed material layer such that these components do not become detached from the electrode mixed material layer.

The binder includes at least a water-soluble polymer and may optionally further include polymers other than the water-soluble polymer (for example, carboxymethyl cellulose, a water-insoluble conjugated diene copolymer, etc.).

[Content]

The water-soluble polymer included in the binder preferably constitutes 20 mass % or more, and more preferably 40 mass % or more of the total amount of the binder from a viewpoint of battery cycle characteristics, and preferably constitutes 80 mass % or less, and more preferably 70 mass % or less of the total amount of the binder from a viewpoint of battery flexibility.

[Water-Soluble Polymer]

[[Chemical Composition]]

The water-soluble polymer includes either or both of a repeating unit derived from an ethylenically unsaturated carboxylic acid monomer (ethylenically unsaturated carboxylic acid monomer unit (A)) and an alkali metal salt thereof, includes a repeating unit derived from a cross-linkable monomer (cross-linkable monomer unit (B)), and may optionally include an ethylenically unsaturated monomer unit (C) and other monomer units (D).

—Ethylenically Unsaturated Carboxylic Acid Monomer Unit (A)—

Examples of ethylenically unsaturated carboxylic acid monomers that can form the ethylenically unsaturated carboxylic acid monomer unit (A) include acrylic acid, methacrylic acid, itaconic acid, maleic acid, fumaric acid, and crotonic acid. One of these ethylenically unsaturated carboxylic acid monomers may be used individually, or two or more of these ethylenically unsaturated carboxylic acid monomers may be used in combination in a freely selected ratio.

Of these ethylenically unsaturated carboxylic acid monomers, acrylic acid, methacrylic acid, itaconic acid, and maleic acid are preferable in terms that an electrode for a lithium ion secondary battery can be caused to display excellent adhesiveness (peel strength), with acrylic acid and methacrylic acid being more preferable, and acrylic acid particularly preferable.

Note that some or all ethylenically unsaturated carboxylic acid monomer units (A) may be present in the form of an alkali metal salt. In other words, the water-soluble polymer includes either or both of an ethylenically unsaturated carboxylic acid monomer unit (A) and an alkali metal salt thereof.

The alkali metal in the alkali metal salt may be Li, Na, K, Rb, Cs, Fr, or the like, for example, without any specific limitations. One of these alkali metals may be used individually, or two or more of these alkali metals may be used in combination in a freely selected ratio. Of these alkali metals, Li, Na, and K are preferable in terms that a lithium ion secondary battery can be caused to display excellent rate characteristics, with Li and Na being more preferable, and Li particularly preferable.

The content ratio of the ethylenically unsaturated carboxylic acid monomer unit (A) relative to all monomer units in the water-soluble polymer (i.e., the proportion constituted by the ethylenically unsaturated carboxylic acid monomer unit (A) among all monomer units included in the water-soluble polymer) is preferably 10 mass % or more, more preferably 15 mass % or more, even more preferably 20 mass % or more, and particularly preferably 30 mass % or more in terms that an electrode for a lithium ion secondary battery can be caused to display excellent adhesiveness (peel strength), and is preferably 95 mass % or less, more preferably 60 mass % or less, and particularly preferably 40 mass % or less in terms that an electrode for a lithium ion secondary battery can be caused to display excellent adhesiveness (peel strength).

—Cross-Linkable Monomer Unit (B)—

Examples of cross-linkable monomers that can form the cross-linkable monomer unit (B) include monomers including at least two polymerizable unsaturated functional groups such as (meth)acryloyl group-containing monomers, allyl group-containing monomers, (meth)acrylates, epoxy group-containing monomers, oxazoline group-containing monomers, and N-methylolamide group-containing monomers. One of these cross-linkable monomers may be used individually, or two or more of these cross-linkable monomers may be used in combination in a freely selected ratio.

Of these cross-linkable monomers, (meth)acryloyl group-containing monomers, allyl group-containing monomers, and (meth)acrylates are preferable in terms that an electrode for a lithium ion secondary battery can be caused to display excellent adhesiveness (peel strength) and a lithium ion secondary battery can be caused to display excellent rate characteristics, with (meth)acryloyl group-containing monomers being more preferable, and acryloyl group-containing monomers particularly preferable.

—(Meth)acryloyl Group-Containing Monomer—

Examples of (meth)acryloyl group-containing monomers that can be used include N,N,N,N-tetraacryloyltriethylenetetramine, N,N,N-triacryloyldiethylenetriamine, and N,N-diacryloyl-4,7,10-trioxa-1,13-tridecanediamine.

—Allyl Group-Containing Monomer—

Examples of allyl group-containing monomers that can be used include pentaerythritol triallyl ether, allyl methacrylate, allyl glycidyl ether, trimethylolpropane diallyl ether, and glycerin monoallyl ether.

—(Meth)acrylate—

Examples of (meth)acrylates that can be used include mono(meth)acrylates such as allyl methacrylate; di(meth)acrylates of dihydric alcohols such as ethylene glycol di(meth)acrylate, propylene glycol di(meth)acrylate, 1,6-hexanediol di(meth)acrylate, polyethylene glycol di(meth)acrylate, and polypropylene glycol di(meth)acrylate; and poly(meth)acrylates (tri(meth)acrylates, tetra(meth)acrylates, etc.) of polyhydric alcohols that are trihydric or higher such as trimethylolpropane tri(meth)acrylate, tri(meth)acrylate of ethylene oxide-modified trimethylolpropane, glycerin tri(meth)acrylate, pentaerythritol tri(meth)acrylate, and pentaerythritol tetra(meth)acrylate.

The number of polymerizable unsaturated groups included in the cross-linkable monomer unit (B) is not specifically limited but is preferably 2 or more, more preferably 3 or more, and particularly preferably 4 or more in terms that an electrode for a lithium ion secondary battery can be caused to display excellent adhesiveness (peel strength) and a lithium ion secondary battery can be caused to display excellent cycle characteristics, and is preferably 6 or fewer in terms that an electrode for a lithium ion secondary battery can be caused to display excellent flexibility (pliability).

The content ratio of the cross-linkable monomer unit (B) relative to all monomer units in the water-soluble polymer (i.e., the proportion constituted by the cross-linkable monomer unit (B) among all monomer units included in the water-soluble polymer) is preferably 0.01 mass % or more, more preferably 0.1 mass % or more, even more preferably 0.3 mass % or more, and particularly preferably 1.0 mass % or more in terms that an electrode for a lithium ion secondary battery can be caused to display excellent adhesiveness (peel strength) and a lithium ion secondary battery can be caused to display excellent cycle characteristics, and is preferably 10 mass % or less, more preferably 5 mass % or less, and particularly preferably 3 mass % or less in terms that a lithium ion secondary battery can be caused to display excellent cycle characteristics.

—Ethylenically Unsaturated Monomer Unit (C)—

An ethylenically unsaturated monomer that can form the ethylenically unsaturated monomer unit (C) is preferably an ethylenically unsaturated monomer having a solubility of 7 g or more per 100 g of water at 20° C. Note that the term "ethylenically unsaturated monomer unit (C)" is not inclusive of monomer units corresponding to the ethylenically unsaturated carboxylic acid monomer unit (A) and the cross-linkable monomer unit (B).

Specific examples of ethylenically unsaturated monomers having a solubility of 7 g or more per 100 g of water at 20° C. include acrylamide, β-hydroxyethyl acrylate, β-hydroxyethyl methacrylate, hydroxyethyl acrylamide, acrylonitrile, methoxyethyl acrylate (MEA), N-vinyl-2-pyrrolidone, and diethylacrylamide. One of these ethylenically unsaturated monomers may be used individually, or two or more of these ethylenically unsaturated monomers may be used in combination in a freely selected ratio.

Of these ethylenically unsaturated monomers, acrylamide, β-hydroxyethyl acrylate, hydroxyethyl acrylamide, acrylonitrile, and methoxyethyl acrylate (MEA) are preferable in terms that an electrode for a lithium ion secondary battery can be caused to display excellent adhesiveness (peel strength), with acrylamide, β-hydroxyethyl acrylate, and hydroxyethyl acrylamide being more preferable, and acrylamide and hydroxyethyl acrylamide particularly preferable.

The content ratio of the ethylenically unsaturated monomer unit (C) relative to all monomer units in the water-soluble polymer (i.e., the proportion constituted by the ethylenically unsaturated monomer unit (C) among all monomer units included in the water-soluble polymer) is preferably 5 mass % or more, more preferably 40 mass % or more, even more preferably 60 mass % or more, and particularly preferably 69 mass % or more in terms that a lithium ion secondary battery can be caused to display excellent cycle characteristics, and is preferably 90 mass % or less, more preferably 85 mass % or less, and particularly preferably 80 mass % or less in terms that a lithium ion secondary battery can be caused to display excellent cycle characteristics.

—Other Monomer Units (D)—

The presently disclosed water-soluble polymer can include monomer units (D) other than the ethylenically unsaturated carboxylic acid monomer unit (A), cross-linkable monomer unit (B), and ethylenically unsaturated monomer unit (C) described above. No specific limitations are placed on monomers that can form such other monomer units (D) so long as they do not interfere with the effects disclosed herein.

[[Content]]

Although no specific limitations are placed on the content of the water-soluble polymer, the content of the water-soluble polymer per 100 parts by mass of slurry solid content is preferably 0.1 parts by mass or more, more preferably 0.3 parts by mass or more, even more preferably 0.5 parts by mass or more, and particularly preferably 1.0 parts by mass or more in terms that a lithium ion secondary battery can be caused to display excellent cycle characteristics, and is preferably 10 parts by mass or less, more preferably 5 parts by mass or less, and particularly preferably 3 parts by mass or less in terms that an electrode for a lithium ion secondary battery can be caused to display excellent flexibility (pliability).

{{Viscosity}}

The viscosity of a 1 mass % aqueous solution of the water-soluble polymer is not specifically limited so long as it is 1,000 mPa·s or less, but is preferably 10 mPa·s or more, more preferably 30 mPa·s or more, even more preferably 50 mPa·s or more, even more preferably 80 mPa·s or more, even more preferably 100 mPa·s or more, and particularly preferably 130 mPa·s or more in terms that a lithium ion secondary battery can be caused to display excellent cycle characteristics, and is preferably 600 mPa·s or less, more preferably 550 mPa·s or less, even more preferably 500 mPa·s or less, even more preferably 400 mPa·s or less, even more preferably 300 mPa·s or less, and particularly preferably 250 mPa·s or less in terms that an electrode for a lithium ion secondary battery can be caused to display excellent flexibility (pliability) and a lithium ion secondary battery can be caused to display excellent rate characteristics.

{{Weight-Average Molecular Weight}}

Although no specific limitations are placed on the weight-average molecular weight of the water-soluble polymer, the weight-average molecular weight of the water-soluble polymer is preferably 300,000 or more, more preferably 500,000 or more, particularly preferably 2,000,000 or more, and most preferably 5,000,000 or more in terms that a lithium ion secondary battery can be caused to display excellent cycle characteristics, and is preferably 15,000,000 or less, more preferably 12,000,000 or less, particularly preferably 10,000,000 or less, and most preferably 8,000,000 or less in terms that an electrode for a lithium ion secondary battery can be caused to display excellent flexibility (pliability) and a lithium ion secondary battery can be caused to display excellent cycle characteristics.

{{Degree of Swelling in Electrolyte Solution}}

Although no specific limitations are placed on the degree of swelling in electrolyte solution of the water-soluble polymer, the degree of swelling in electrolyte solution is preferably 100% or more, and preferably 105% or more in terms that a lithium ion secondary battery can be caused to display excellent cycle characteristics, and is preferably less than 120%, more preferably 115% or less, and particularly preferably 110% or less in terms that a lithium ion secondary battery can be caused to display excellent cycle characteristics.

—Electrolyte Solution—

The electrolyte solution may be an electrolyte solution that is obtained by dissolving an electrolyte in a solvent.

The solvent may be an organic solvent in which the electrolyte is soluble. Specifically, the solvent may be an alkyl carbonate solvent to which a viscosity modification solvent is added. Examples of the alkyl carbonate solvent include ethylene carbonate, propylene carbonate, and γ-butyrolactone. Examples of the viscosity modification solvent include 2,5-dimethyltetrahydrofuran, tetrahydrofuran, diethyl carbonate, ethyl methyl carbonate, dimethyl carbonate, methyl acetate, dimethoxyethane, dioxolane, methyl propionate, and methyl formate.

The electrolyte may be a lithium salt. Examples of lithium salts that may be used include those described in JP2012-204303A. Of these lithium salts, $LiPF_6$, $LiClO_4$, and $CF_3SO_3Li$ are preferred as electrolytes because they readily dissolve in organic solvents and exhibit a high degree of dissociation.

[[Production Method]]

The production method of the water-soluble polymer is not specifically limited, and the water-soluble polymer may be produced by polymerization of a monomer composition containing the monomers described above, performed in an aqueous solvent, for example.

Note that the content (mass %) of each monomer among all monomers in the monomer composition is normally the same as the content (mass %) of each monomer unit in the target water-soluble polymer.

The polymerization method is not specifically limited, and any of solution polymerization, suspension polymerization, bulk polymerization, and emulsion polymerization may be used. Moreover, ionic polymerization, radical polymerization, living radical polymerization, or the like may be adopted as the polymerization reaction. A known emulsifier or polymerization initiator may be used in the polymerization as necessary.

Note that in a case in which polymerization of the monomer composition is performed in an aqueous solvent, the resultant aqueous solution containing the water-soluble polymer may be used in that form as the binder.

The water-soluble polymer obtained through production as described above is required to be water-soluble. In the present specification, "water-soluble" means that when 0.5 g (in terms of solid content) of a polymer is dissolved in 100 g of water, insoluble content is 10 mass % or less, whereas "water-insoluble" means that when 0.5 g (in terms of solid content) of a polymer is dissolved in 100 g of water, insoluble content is more than 10 mass %.

[Carboxymethyl Cellulose]

The carboxymethyl cellulose is a product in which hydroxyl groups of cellulose are substituted with carboxyl groups and includes at least one of carboxymethyl cellulose and a salt thereof. Examples of carboxymethyl cellulose salts that can be used include, but are not specifically limited to, sodium salt, ammonium salt, and lithium salt of carboxymethyl cellulose.

The carboxyl groups of carboxymethyl cellulose (CMC) readily react with a cationic side of a silicic acid compound, and thus adhesiveness (peel strength) of an electrode for a lithium ion secondary battery is further improved.

The degree of substitution of the carboxymethyl cellulose (CMC) is preferably 0.5 or more from a viewpoint of coating stability, and is preferably 1.0 or less from a viewpoint of peel strength.

The weight-average molecular weight (Mw) of the carboxymethyl cellulose (CMC) is preferably 100,000 or more from a viewpoint of peel strength, and is preferably 500,000 or less from a viewpoint of coating stability.

[[Content]]

Although no specific limitations are placed on the content of the carboxymethyl cellulose, the content of the carboxymethyl cellulose per 100 parts by mass of slurry solid content is preferably 0.1 parts by mass or more, more preferably 0.5 parts by mass or more, and even more preferably 0.8 parts by mass or more in terms that an electrode for a lithium ion secondary battery can be caused to display excellent adhesiveness (peel strength), and is preferably 2.5 parts by mass or less, more preferably 2 parts by mass or less, and particularly preferably 1.5 parts by mass or less in terms that an electrode for a lithium ion secondary battery can be caused to display excellent flexibility (pliability) and a lithium ion secondary battery can be caused to display excellent rate characteristics.

[Water-Insoluble Conjugated Diene Copolymer]

The water-insoluble conjugated diene copolymer is completely different to the water-soluble polymer in terms that it is a water-insoluble particulate (dispersed) copolymer.

[[Particle Diameter]]

From a viewpoint of electrode peel strength, the volume-average particle diameter D50 of the water-insoluble conjugated diene copolymer is preferably 90 nm or more, and more preferably 120 nm or more, and is preferably 500 nm or less, and more preferably 250 nm or less.

[[Chemical Composition]]

The water-insoluble conjugated diene copolymer preferably includes a conjugated diene monomer unit, an aromatic vinyl monomer unit, and an ethylenically unsaturated carboxylic acid monomer unit, and may optionally include other monomer units.

—Conjugated Diene Monomer Unit—

Examples of conjugated diene monomers that can form the conjugated diene monomer unit include 1,3-butadiene, 2-methyl-1,3-butadiene, 2,3-dimethyl-1,3-butadiene, 1,3-pentadiene, and isoprene. One of these conjugated diene monomers may be used individually, or two or more of these conjugated diene monomers may be used in combination in a freely selected ratio.

Of these conjugated diene monomers, 1,3-butadiene and isoprene are preferable from a viewpoint of binding capacity, with 1,3-butadiene being more preferable.

The content ratio of the conjugated diene monomer unit relative to all monomer units in the water-insoluble conjugated diene copolymer is preferably 10 mass % or more, more preferably 20 mass % or more, even more preferably 25 mass % or more, and particularly preferably 30 mass % or more from a viewpoint of electrode flexibility, and is preferably 80 mass % or less, more preferably 60 mass % or less, and particularly preferably 50 mass % or less from a viewpoint of peel strength.

—Aromatic Vinyl Monomer Unit—

Examples of aromatic vinyl monomers that can form the aromatic vinyl monomer unit include styrene, α-methylstyrene, vinyltoluene, 2-vinylnaphthalene, vinylpyridine, and divinylbenzene. One of these aromatic vinyl monomers may be used individually, or two or more of these aromatic vinyl monomers may be used in combination in a freely selected ratio. Of these aromatic vinyl monomers, styrene is preferable in terms of having good copolymerizability with other monomers.

The content ratio of the aromatic vinyl monomer unit relative to all monomer units in the water-insoluble conjugated diene copolymer is preferably 20 mass % or more, more preferably 30 mass % or more, even more preferably 40 mass % or more, and particularly preferably 54 mass % or more from a viewpoint of copolymerizability with other monomers, and is preferably 80 mass % or less, more preferably 70 mass % or less, even more preferably 64 mass % or less, and particularly preferably 60 mass % or less from a viewpoint of electrode flexibility.

—Ethylenically Unsaturated Carboxylic Acid Monomer Unit—

Examples of ethylenically unsaturated carboxylic acid monomers that can form the ethylenically unsaturated carboxylic acid monomer unit include itaconic acid, acrylic acid, methacrylic acid, maleic acid, fumaric acid, and crotonic acid. One of these ethylenically unsaturated carboxylic acid monomers may be used individually, or two or more of these ethylenically unsaturated carboxylic acid monomers may be used in combination in a freely selected ratio.

Of these ethylenically unsaturated carboxylic acid monomers, itaconic acid, acrylic acid, and methacrylic acid are preferable from a viewpoint of peel strength, with itaconic acid and methacrylic acid being more preferable, and itaconic acid particularly preferable.

The content ratio of the ethylenically unsaturated carboxylic acid monomer unit relative to all monomer units in the water-insoluble conjugated diene copolymer is preferably 0.1 mass % or more, more preferably 0.5 mass % or more, and particularly preferably 1.0 mass % or more from a viewpoint of electrode peel strength, and is preferably 20 mass % or less, more preferably 10 mass % or less, even more preferably 6.0 mass % or less, and particularly preferably 5.0 mass % or less from a viewpoint of electrode flexibility.

—Other Monomer Units—

The presently disclosed water-insoluble conjugated diene copolymer can include other monomer units besides the conjugated diene monomer unit, aromatic vinyl monomer unit, and ethylenically unsaturated carboxylic acid monomer unit described above. No specific limitations are placed on monomers that can form such other monomer units so long as they do not interfere with the effects disclosed herein and examples thereof include hydroxyl group-containing monomers such as 2-hydroxyethyl acrylate; sulfo group-containing monomers such as acrylamido-2-methylpropane sulfonic acid; and cyano group-containing monomers such as acrylonitrile and methacrylonitrile. One of these monomers may be used individually, or two or more of these monomers may be used in combination in a freely selected ratio.

[[Content]]

Although no specific limitations are placed on the content of the water-insoluble conjugated diene copolymer, the content of the water-insoluble conjugated diene copolymer per 100 parts by mass of slurry solid content is preferably 0.1 parts by mass or more, more preferably 0.5 parts by mass or more, and even more preferably 0.8 parts by mass or more in terms that an electrode for a lithium ion secondary battery can be caused to display excellent adhesiveness (peel strength) and cycle characteristics of a lithium ion secondary battery can be further improved, and is preferably 2.5 parts by mass or less, more preferably 2 parts by mass or less, and particularly preferably 1.5 parts by mass or less in terms that a lithium ion secondary battery can be caused to display excellent rate characteristics.

{{Glass-Transition Temperature (Tg)}}

Although no specific limitations are placed on the glass-transition temperature (Tg) of the water-insoluble conjugated diene copolymer, the glass-transition temperature (Tg) thereof is preferably 0° C. or higher, more preferably 5° C. or higher, and particularly preferably 10° C. or higher in terms that a lithium ion secondary battery can be caused to display excellent cycle characteristics, and is preferably 50° C. or lower, more preferably 40° C. or lower, and particularly preferably 30° C. or lower in terms that an electrode for a lithium ion secondary battery can be caused to display excellent flexibility (pliability).

<Carbon-Based Active Material>

The carbon-based active material is an active material having a main framework of carbon into which lithium can be inserted (also referred to as "doping"). The material of the carbon-based active material may be a graphitic material or a carbonaceous material, for example, and is preferably a graphitic material. Moreover, the form of the carbon-based active material may be a flake form, a spherical form, or the like, for example, and is preferably a flake form. The carbon-based active material is preferably graphite particles.

The content of the carbon-based active material when slurry solid content is taken to be 100 parts by mass is preferably more than 0 parts by mass, and more preferably 50 parts by mass or more from a viewpoint of battery cycle characteristics, and is preferably 95 parts by mass or less, and more preferably 90 parts by mass or less from a viewpoint of battery capacity.

A carbonaceous material is a material with a low degree of graphitization (i.e., low crystallinity) that can be obtained by carbonizing a carbon precursor by heat treatment at 2000° C. or lower. The lower limit of the heat treatment temperature in the carbonization is not specifically limited and may for example be 500° C. or higher.

Examples of carbonaceous materials include graphitizing carbon whose carbon structure can easily be changed according to the heat treatment temperature and non-graphitizing carbon having a structure similar to an amorphous structure, which is typified by glassy carbon.

The graphitizing carbon may be a carbon material made using tar pitch obtained from petroleum or coal as a raw material. Specific examples include coke, meso-carbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

A graphitic material is a material having high crystallinity of a similar level to graphite. The graphitic material can be obtained by heat-treating graphitizing carbon at 2000° C. or higher. The upper limit of the heat treatment temperature is not specifically limited and may for example be 5000° C. or lower.

Examples of the graphitic material include natural graphite and artificial graphite.

Examples of the artificial graphite include artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

<Metal-Based Active Material>

A metal-based active material may be included as another active material.

The metal-based active material is an active material that contains metal, the structure of which usually contains an element that allows insertion of lithium, and that has a theoretical electric capacity per unit mass of 500 mAh/g or more when lithium is inserted. Examples of metal-based active materials that can be used include lithium metal, simple substances of metals other than Si that can form a lithium alloy (for example, Ag, Al, Ba, Bi, Cu, Ga, Ge, In, Ni, P, Pb, Sb, Sn, Sr, Zn, and Ti) and alloys thereof, and oxides, sulfides, nitrides, carbides, and phosphides of any of the preceding examples.

<Solvent>

Water is preferably used as the solvent. Water may be used by itself as the solvent or a mixed solvent of water and an organic solvent that is miscible with water may be used as the solvent. Note that at least a portion of the solvent can, without any specific limitations, be a polymerization solvent (for example, water) that was contained in a monomer composition used to produce the water-soluble polymer.

<Other Components>

Other components besides those described above, such as thickeners (excluding those corresponding to the previously described water-soluble polymer), conductive materials, reinforcing materials, leveling agents, and additives for electrolyte solution, may also be included. Commonly known examples of such other components can be used without any specific limitations so long as they do not affect battery reactions. One of these components may be used individually, or two or more of these components may be used in combination in a freely selected ratio.

<Production of Slurry Composition>

The slurry composition set forth above can be produced by adding a dispersion medium such as water to the components described above, as necessary, and performing mixing thereof. Specifically, the slurry composition can be produced by mixing the above-described components and an aqueous medium using a mixer such as a ball mill, a sand mill, a bead mill, a pigment disperser, a grinding machine, an ultrasonic disperser, a homogenizer, a planetary mixer, or a FILMIX. Mixing of the above-described components can normally be performed for a period of from 10 minutes to several hours in a temperature range of from room temperature to 80° C.

(Electrode for Lithium Ion Secondary Battery)

The presently disclosed electrode for a lithium ion secondary battery can be produced using the presently disclosed slurry composition for a lithium ion secondary battery.

Specifically, the electrode for a lithium ion secondary battery includes a current collector and an electrode mixed material layer formed on the current collector, and contains at least a silicon compound and a binder in the electrode mixed material layer. Note that each component contained in the electrode mixed material layer is a component that was contained in the slurry composition for a lithium ion secondary battery set forth above and the preferred ratio of each component in the electrode mixed material layer is the same as the preferred ratio of the component in the slurry composition.

The electrode for a lithium ion secondary battery can display excellent adhesiveness (peel strength) and flexibility (pliability) and can cause a lithium ion secondary battery to display excellent rate characteristics and cycle characteristics as a result of being produced using the presently disclosed slurry composition for a lithium ion secondary battery.

<Production of Electrode for Lithium Ion Secondary Battery>

The electrode for a lithium ion secondary battery is produced, for example, through a step of applying the slurry composition for a lithium ion secondary battery set forth above onto a current collector (application step) and a step of drying the slurry composition for a lithium ion secondary battery that has been applied onto the current collector to form an electrode mixed material layer on the current collector (drying step).

[Application Step]

The slurry composition for a lithium ion secondary battery can be applied onto the current collector by any commonly known method without any specific limitations. Specific examples of application methods that can be used include doctor blading, dip coating, reverse roll coating, direct roll coating, gravure coating, extrusion coating, and brush coating. In the application, the slurry composition for a lithium ion secondary battery may be applied onto one side or both sides of the current collector.

The thickness of the slurry coating on the current collector after application but before drying may be set as appropriate in accordance with the thickness of the electrode mixed material layer to be obtained after drying.

The current collector onto which the slurry composition for a lithium ion secondary battery is applied is a material having electrical conductivity and electrochemical durability. Specifically, the current collector may be made of, for example, iron, copper, aluminum, nickel, stainless steel, titanium, tantalum, gold, or platinum. Of these materials, copper foil is particularly preferable as a current collector used in a negative electrode, whereas aluminum is particularly preferable as a current collector used in a positive electrode. One of these materials may be used individually, or two or more of these materials may be used in combination in a freely selected ratio.

[Drying Step]

The slurry composition on the current collector can be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition for a lithium ion secondary battery on the current collector in this manner, an electrode mixed material layer is formed on the current collector, and thus an electrode for a lithium ion secondary battery including the current collector and the electrode mixed material layer can be obtained.

After the drying step, the electrode mixed material layer may be further subjected to a pressing process, such as mold pressing or roll pressing. The pressing process can improve close adherence between the electrode mixed material layer and the current collector.

Furthermore, in a case in which the electrode mixed material layer contains a curable polymer, the polymer is preferably cured after the electrode mixed material layer has been formed.

<Lithium Ion Secondary Battery>

A lithium ion secondary battery can be produced using the electrode for a lithium ion secondary battery set forth above. Specifically, the lithium ion secondary battery includes a positive electrode, a negative electrode, an electrolyte solution, and a separator, and may, for example, have the electrode for a lithium ion secondary battery set forth above as the negative electrode. The lithium ion secondary battery has excellent rate characteristics and cycle characteristics as a result of the electrode for a lithium ion secondary battery set forth above being used.

[Positive Electrode]

The positive electrode of the lithium ion secondary battery can be a known positive electrode that is used as a positive electrode for a lithium ion secondary battery, for example. Specifically, a positive electrode that is obtained by forming a positive electrode mixed material layer on a current collector, for example, can be used as the positive electrode.

The current collector may be made of a metal material such as aluminum. The positive electrode mixed material layer may be a layer containing a known positive electrode active material, conductive material, and binder.

[Negative Electrode]

The negative electrode can be the presently disclosed electrode for a lithium ion secondary battery set forth above, for example.

[Electrolyte Solution]

The electrolyte solution may be an electrolyte solution that is obtained by dissolving an electrolyte in a solvent.

The solvent may be an organic solvent in which the electrolyte is soluble. Specifically, the solvent may be an alkyl carbonate solvent to which a viscosity modification solvent is added. Examples of the alkyl carbonate solvent include ethylene carbonate, propylene carbonate, and γ-butyrolactone. Examples of the viscosity modification solvent include 2,5-dimethyltetrahydrofuran, tetrahydrofuran, diethyl carbonate, ethyl methyl carbonate, dimethyl carbonate, methyl acetate, dimethoxyethane, dioxolane, methyl propionate, and methyl formate.

The electrolyte may be a lithium salt. Examples of lithium salts that may be used include those described in JP2012-204303A. Of these lithium salts, $LiPF_6$, $LiClO_4$, and $CF_3SO_3Li$ are preferred as electrolytes because they readily dissolve in organic solvents and exhibit a high degree of dissociation.

[Separator]

The separator may be a separator such as described in JP2012-204303A, for example. Of these separators, a microporous membrane made of polyolefinic resin (polyethylene, polypropylene, polybutene, or polyvinyl chloride) is preferred since such a membrane can reduce the total thickness of the separator, which increases the ratio of electrode active material in the lithium ion secondary battery, and consequently increases the volumetric capacity.

[Production Method of Lithium Ion Secondary Battery]

The lithium ion secondary battery set forth above can be produced by, for example, stacking the positive electrode and the negative electrode with the separator in-between, performing rolling, folding, or the like of the resultant laminate in accordance with the battery shape, as necessary, to place the laminate in a battery container, injecting the electrolyte solution into the battery container, and sealing the battery container. In order to prevent pressure increase inside the lithium ion secondary battery and occurrence of overcharging or overdischarging, an overcurrent preventing device such as a fuse or a PTC device, an expanded metal, or a lead plate may be provided as necessary. The shape of the lithium ion secondary battery may be a coin type, a button type, a sheet type, a cylinder type, a prismatic type, a flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, (1) adhesiveness (peel strength) of a negative electrode (negative electrode mixed material layer), (2) flexibility (pliability) of a negative electrode, (3) rate characteristics of a secondary battery, and (4) cycle characteristics of a secondary battery were evaluated by methods described below, (5) weight-average molecular weight (Mw) of a water-soluble polymer, (6) degree of swelling in electrolyte solution of a water-soluble polymer, (7) viscosity of a 1 mass % aqueous solution of a water-soluble polymer, (8) content (mass %) of a silicon compound, and (9) glass-transition temperature of a water-insoluble conjugated diene polymer were measured by methods described below, and (10) production of a water-soluble polymer A, (11) production of a water-soluble polymer B, (12) production of a water-soluble polymer C, (13) production of a water-soluble polymer D, (14) production of a water-soluble polymer E, (15) production of a water-soluble polymer F, (16) production of a water-soluble polymer G, (17) production of a water-soluble polymer H, (18) production of a water-soluble polymer I, (19) production of a water-soluble polymer J, (20) production of a water-insoluble conjugated diene polymer I, (21) production of a water-insoluble conjugated diene polymer II, (22) production of a silicon compound X, and (23) production of a silicon compound Y were carried out by methods described below.

<(1) Adhesiveness (Peel Strength) of Negative Electrode (Negative Electrode Mixed Material Layer)>

A produced negative electrode for a lithium ion secondary battery was cut out as a rectangle of 100 mm in length by 10 mm in width to obtain a test specimen. The test specimen was placed with a surface at which the negative electrode mixed material layer was located facing downward and the surface of the negative electrode mixed material layer was affixed to the surface of a substrate made of SUS using cellophane tape (tape prescribed by JIS Z 1522). Thereafter, the stress (N/m) when the current collector was peeled off by pulling one end of the current collector in a perpendicular direction at a pulling speed of 50 mm/min was measured. (Note that the cellophane tape was secured to the surface of the SUS substrate). Three measurements were performed in the same manner, and the average value thereof was determined as the peel strength and was evaluated by the following standard. A larger value for the peel strength indicates stronger close adherence between the negative electrode mixed material layer and the current collector and better adhesiveness of the negative electrode (negative electrode mixed material layer).

A: Peel strength of 10.0 N/m or more
B: Peel strength of not less than 8.0 N/m and less than 10.0 N/m
C: Peel strength of not less than 6.0 N/m and less than 8.0 N/m
D: Peel strength of not less than 4.0 N/m and less than 6.0 N/m
E: Peel strength of less than 4.0 N/m <(2) Flexibility (Pliability) of Negative Electrode>

A produced negative electrode for a lithium ion secondary battery was wound around rods of different diameters with the rod placed against the current collector side thereof and the occurrence of cracking of the negative electrode mixed material layer (negative electrode active material layer) was evaluated. A smaller rod diameter indicates that the negative electrode has better flexibility (pliability). When a negative electrode has excellent flexibility (pliability), a secondary battery also has excellent cycle characteristics because peeling of the negative electrode mixed material layer (negative electrode active material layer) can be inhibited.

A: Cracking does not occur with rod of 1.2 mm in diameter
B: Cracking does not occur with rod of 1.5 mm in diameter
C: Cracking does not occur with rod of 2 mm in diameter
D: Cracking does not occur with rod of 3 mm in diameter
E: Cracking does not occur with rod of 4 mm in diameter <(3) Rate Characteristics of Secondary Battery>

A produced lithium ion secondary battery was left at rest at a temperature of 25° C. for 5 hours after injection of electrolyte solution. Next, the lithium ion secondary battery was charged to a cell voltage of 3.65 V by a 0.2 C constant-current method at a temperature of 25° C. and was subsequently subjected to 12 hours of aging at a temperature of 60° C. The lithium ion secondary battery was then discharged to a cell voltage of 3.00 V by a 0.2 C constant-current method at a temperature of 25° C. Thereafter, CC-CV charging (upper limit cell voltage: 4.35 V) was performed with a 0.2 C constant current and CC discharging was performed to a cell voltage of 3.00 V with a 0.2 C constant current. This charging and discharging at 0.2 C was repeated three times.

Next, the lithium ion secondary battery was subjected to 0.2 C constant-current charging and discharging between cell voltages of 4.35 V and 3.00 V in an environment having a temperature of 25° C., and the discharge capacity at that time was defined as C0. The lithium ion secondary battery was subsequently CC-CV charged with a 0.2 C constant current in the same manner and was discharged to 2.5 V with a 0.5 C constant current in an environment having a temperature of −10° C. The discharge capacity at that time was defined as C1. A capacity change rate indicated by $\Delta C=(C1/C0)\times100(\%)$ was calculated as a rate characteristic and was evaluated by the following standard. A larger value for the capacity change rate $\Delta C$ indicates a higher discharge capacity at high current in a low-temperature environment and lower internal resistance.

A: Capacity change rate $\Delta C$ of 70% or more
B: Capacity change rate $\Delta C$ of not less than 65% and less than 70%
C: Capacity change rate $\Delta C$ of not less than 60% and less than 65%
D: Capacity change rate $\Delta C$ of not less than 55% and less than 60%
E: Capacity change rate $\Delta C$ of less than 55%

<(4) Cycle Characteristics of Secondary Battery>

A produced lithium ion secondary battery was left at rest in a 25° C. environment for 24 hours. Thereafter, the lithium ion secondary battery was subjected to a charge/discharge operation of charging to 4.35 V by a constant-voltage constant-current (CC-CV) method (cut-off condition: 0.02 C) at a charge rate of 1 C and discharging to 3.0 V by a constant-current (CC) method at a discharge rate of 1 C at 25° C., and the initial capacity C0 was measured.

The lithium ion secondary battery was repeatedly subjected to the same charge/discharge operation in a 25° C. environment and the capacity C1 after 300 cycles was measured. The capacity maintenance rate $\Delta C=(C1/C0)\times100$ (%) was calculated and was evaluated by the following standard. A higher value for the capacity maintenance rate indicates a smaller decrease of discharge capacity and better cycle characteristics.

A: Capacity maintenance rate $\Delta C$ of 85% or more
B: Capacity maintenance rate $\Delta C$ of not less than 80% and less than 85%
C: Capacity maintenance rate $\Delta C$ of not less than 75% and less than 80%
D: Capacity maintenance rate $\Delta C$ of not less than 70% and less than 75%
E: Capacity maintenance rate $\Delta C$ of less than 70%

<(5) Weight-Average Molecular Weight (Mw) of Water-Soluble Polymer>

A produced water-soluble polymer was diluted to 0.05 mass % with Tris-HCl buffer solution, was filtered through a 0.45 μm filter, and was used to measure the weight-average molecular weight (Mw) of the water-soluble polymer by gel permeation chromatography (measurement apparatus: HLC-8320 produced by Tosoh Corporation; column: OHpac SB-G produced by Shodex, OHpac SB-807HQ produced by Shodex, OHpac 806M HQ produced by Shodex; standard material: monodisperse pullulan). The measurement results are shown in Tables 1 and 2.

<(6) Degree of Swelling in Electrolyte Solution of Water-Soluble Polymer>

A produced aqueous solution containing a water-soluble polymer was dried in an environment having a humidity of 50% and a temperature of 23° C. to 25° C. to form a film of 0.5±0.1 mm in thickness. The formed film was dried by a vacuum dryer at a temperature of 60° C. for 10 hours, was subsequently cut up, and approximately 1 g thereof was precisely weighed. The mass of the obtained film piece was taken to be W0. The film piece was immersed in electrolyte solution (chemical composition: $LiPF_6$ solution of 1.0 M in concentration (solvent: mixed solvent of ethylene carbonate (EC)/ethyl methyl carbonate (EMC)=3/7 (volume ratio); additive: 2 volume % (solvent ratio) of vinylene carbonate)) in an environment having a temperature of 60° C. for 3 days and was allowed to swell. Thereafter, the film piece was pulled out of the electrolyte solution and the mass thereof was measured after electrolyte solution on the surface of the film piece had been wiped off using a KimWipe. The mass of the swollen film piece was taken to be W1.

The degree of swelling in electrolyte solution of the water-soluble polymer was calculated using the following formula. The calculation results are shown in Tables 1 and 2.

Degree of swelling in electrolyte solution (mass %)=W1/W0×100

<(7) Viscosity of 1 Mass % Aqueous Solution of Water-Soluble Polymer>

A produced aqueous solution containing a water-soluble polymer was diluted to 1 mass %. Thereafter, the temperature of the aqueous solution was set to 25° C. using a thermostatic water tank and the viscosity of the aqueous solution was measured using a B-type viscometer. The measurement results are shown in Tables 1 and 2.

<(8) Content (Mass %) of Prescribed Silicon Compound in Silicon Compound>

A prescribed silicon compound ($Li_2SiO_3$ or $Li_4SiO_4$) in a silicon compound was measured under the following conditions by NMR (nuclear magnetic resonance) using the $^{29}Si$ MAS NMR (magic angle spinning nuclear magnetic resonance) method. The measurement results are shown in Tables 1 and 2.

Apparatus: 700 NMR spectrometer produced by Bruker Corporation
Probe: 4 mm HR-MAS rotor 50 μL
Sample spinning speed: 10 kHz
Measurement environment temperature: 25° C.

<(9) Glass-Transition Temperature of Water-Insoluble Conjugated Diene Polymer>

A produced water-insoluble conjugated diene polymer was used as a measurement sample. A differential scanning calorimetry (DSC) curve was measured by weighing 10 mg of the measurement sample into an aluminum pan and then performing measurement thereof under conditions prescribed by JIS Z 8703 with a measurement temperature range of −100° C. to 500° C., a heating rate of 10° C./min, and an empty aluminum pan as a reference, using a differential scanning calorimeter (EXSTAR DSC6220 produced by SII NanoTechnology Inc.). In the heating process, an intersection point of a baseline directly before a heat absorption peak on the DSC curve at which a derivative signal (DDSC) reached 0.05 mW/min/mg or more and a tangent to the DSC curve at a first inflection point to appear after the heat absorption peak was determined as the glass-transition temperature (° C.) of the water-insoluble conjugated diene polymer. The results are shown in Tables 1 and 2.

<(10) Production of Water-Soluble Polymer A>

A 1 L flask equipped with a septum was charged with 620 parts of deionized water. The deionized water was heated to a temperature of 40° C., and the inside of the flask was purged with nitrogen gas at a flow rate of 1 L/min. Next, 10 parts of deionized water, 24.0 parts of acrylic acid as an ethylenically unsaturated carboxylic acid monomer for forming an ethylenically unsaturated carboxylic acid monomer unit (A) in a water-soluble polymer A, 16.0 parts of a 5.0% aqueous solution of N,N,N,N-tetraacryloyltriethylenetetramine (FAM-402 produced by FUJIFILM Corporation; polymerizable unsaturated groups=4) as a cross-linkable monomer for forming a cross-linkable monomer unit (B) in the water-soluble polymer A, and 138 parts of a 40.0% aqueous solution of acrylamide as an ethylenically unsaturated monomer for forming an ethylenically unsaturated monomer unit (C) in the water-soluble polymer A were mixed and were injected into the flask by a syringe. Thereafter, 9.6 parts of a 2.5% aqueous solution of potassium persulfate as a polymerization initiator was added into the flask by a syringe. In addition, 5 minutes later, 2.5 parts of a 2.5% aqueous solution of ascorbic acid as a polymerization accelerator was added by a syringe. Four hours later, 4.8 parts of a 2.5% aqueous solution of potassium persulfate as a polymerization initiator was added into the flask, 1.8 parts of a 2.5% aqueous solution of sodium bisulfite as a polymerization accelerator was added, and the reaction was allowed to proceed under heating to a temperature of 60° C. Three hours later, the flask was opened to air, the polymerization reaction was terminated, and cooling was performed to a temperature of 30° C. or lower.

The product was subsequently adjusted to a pH of 8 using an 8.0% aqueous solution of lithium hydroxide to yield an aqueous solution containing a water-soluble polymer A.

<(11) Production of Water-Soluble Polymer B>

A water-soluble polymer B was produced in the same way as in (10) production of the water-soluble polymer A with the exception that instead of using 16.0 parts of a 5.0% aqueous solution of N,N,N,N-tetraacryloyltriethylenetetramine (FAM-402 produced by FUJIFILM Corporation; polymerizable unsaturated groups=4) in (10) production of the water-soluble polymer A, 0.8 parts of allyl methacrylate (produced by Mitsubishi Gas Chemical Company, Ltd.; polymerizable unsaturated groups=2) was used.

<(12) Production of Water-Soluble Polymer C>

A water-soluble polymer C was produced in the same way as in (10) production of the water-soluble polymer A with the exception that instead of using 16.0 parts of a 5.0% aqueous solution of N,N,N,N-tetraacryloyltriethylenetetramine (FAM-402 produced by FUJIFILM Corporation; polymerizable unsaturated groups=4) in (10) production of the water-soluble polymer A, 0.8 parts of pentaerythritol triallyl ether (produced by Daiso Co., Ltd.; product name: NEOALLYL P-30; polymerizable unsaturated groups=3) was used.

<(13) Production of Water-Soluble Polymer D>

A water-soluble polymer D was produced in the same way as in (10) production of the water-soluble polymer A with the exception that instead of using 16.0 parts of a 5.0% aqueous solution of N,N,N,N-tetraacryloyltriethylenetetramine (FAM-402 produced by FUJIFILM Corporation; polymerizable unsaturated groups=4) and 138 parts of a 40% aqueous solution of acrylamide in (10) production of the water-soluble polymer A, 3.2 parts of a 5.0% aqueous solution of N,N,N,N-tetraacryloyltriethylenetetramine (FAM-402 produced by FUJIFILM Corporation; polymerizable unsaturated groups=4) and 139.6 parts of a 40% aqueous solution of acrylamide were used.

<(14) Production of Water-Soluble Polymer E>

A water-soluble polymer E was produced in the same way as in (10) production of the water-soluble polymer A with the exception that instead of using 138 parts of a 40% aqueous solution of acrylamide in (10) production of the water-soluble polymer A, 138 parts of a 40% aqueous solution of β-hydroxyethyl acrylate was used.

<(15) Production of Water-Soluble Polymer F>

A water-soluble polymer F was produced in the same way as in (10) production of the water-soluble polymer A with the exception that instead of using 24 parts of acrylic acid and 138 parts of a 40% aqueous solution of acrylamide in (10) production of the water-soluble polymer A, 64 parts of acrylic acid and 38 parts of a 40% aqueous solution of acrylamide were used.

<(16) Production of Water-Soluble Polymer G>

A water-soluble polymer G was produced in the same way as in (10) production of the water-soluble polymer A with the exception that instead of using 24 parts of acrylic acid in (10) production of the water-soluble polymer A, 24 parts of methacrylic acid was used.

<(17) Production of Water-Soluble Polymer H>

A water-soluble polymer H was produced in the same way as in (10) production of the water-soluble polymer A with the exception that instead of using an 8.0% aqueous solution of lithium hydroxide in (10) production of the water-soluble polymer A, an 8.0% aqueous solution of potassium hydroxide was used.

<(18) Production of Water-Soluble Polymer I>

A water-soluble polymer I was produced in the same way as in (10) production of the water-soluble polymer A with the exception that instead of producing the water-soluble polymer A using 16.0 parts of a 5.0% aqueous solution of N,N,N,N-tetraacryloyltriethylenetetramine (FAM-402 produced by FUJIFILM Corporation; polymerizable unsaturated groups=4) and 138 parts of a 40% aqueous solution of acrylamide in (10) production of the water-soluble polymer A, the water-soluble polymer I was produced using 140 parts of a 40% aqueous solution of acrylamide.

<(19) Production of Water-Soluble Polymer J>

A water-soluble polymer J was produced in the same way as in (10) production of the water-soluble polymer A with the exception that instead of adding 9.6 parts of a 2.5% aqueous solution of potassium persulfate as a polymerization initiator into the flask by a syringe and adding 2.5 parts of an aqueous solution of ascorbic acid as a polymerization accelerator by a syringe in (10) production of the water-soluble polymer A, 6.4 parts of a 2.5% aqueous solution of potassium persulfate as a polymerization initiator was added into the flask by a syringe and 1.7 parts of a 2.5% aqueous solution of ascorbic acid as a polymerization accelerator was added by a syringe.

<(20) Production of Water-Insoluble Conjugated Diene Polymer I>

A 5 MPa pressure vessel equipped with a stirrer was charged with 64 parts of styrene as an aromatic vinyl monomer for forming an aromatic vinyl monomer unit, 29 parts of 1,3-butadiene as a conjugated diene monomer for forming a conjugated diene monomer unit, 6 parts of itaconic acid as an ethylenically unsaturated carboxylic acid monomer for forming an ethylenically unsaturated carboxylic acid monomer unit, 1 part of 2-hydroxyethyl acrylate (β-hydroxyethyl acrylate) as a hydroxyl group-containing monomer for forming a hydroxyl group-containing monomer unit, 0.3 parts of t-dodecyl mercaptan as a molecular weight modifier, 5 parts of sodium dodecylbenzenesulfonate as an emulsifier, 150 parts of deionized water as a solvent, and 1 part of potassium persulfate as a polymerization initiator. These materials were sufficiently stirred and were then heated to a temperature of 55° C. to initiate polymerization. Cooling was performed to quench the reaction once monomer consumption had reached 95.0%. A water dispersion containing a polymer that was obtained in this manner was adjusted to a pH of 8 through addition of 5% sodium hydroxide aqueous solution. Thereafter, unreacted monomer was removed by thermal-vacuum distillation. Cooling was subsequently performed to a temperature of 30° C. or lower to yield a water dispersion containing a water-insoluble conjugated diene polymer I (glass-transition temperature Tg: 25° C.) as a binder.

<(21) Production of Water-Insoluble Conjugated Diene Polymer II>

A 5 MPa pressure vessel equipped with a stirrer was charged with 54 parts of styrene as an aromatic vinyl monomer for forming an aromatic vinyl monomer unit, 39 parts of 1,3-butadiene as a conjugated diene monomer for forming a conjugated diene monomer unit, 6 parts of itaconic acid as an ethylenically unsaturated carboxylic acid monomer for forming an ethylenically unsaturated carboxylic acid monomer unit, 1 part of 2-hydroxyethyl acrylate (β-hydroxyethyl acrylate) as a hydroxyl group-containing monomer for forming a hydroxyl group-containing monomer unit, 0.3 parts of t-dodecyl mercaptan as a molecular weight modifier, 5 parts of sodium dodecylbenzenesulfonate as an emulsifier, 150 parts of deionized water as a solvent, and 1 part of potassium persulfate as a polymerization initiator. These materials were sufficiently stirred and were then heated to a temperature of 55° C. to initiate polymerization. Cooling was performed to quench the reaction once monomer consumption had reached 95.0%. A water dispersion containing a polymer that was obtained in this manner was adjusted to a pH of 8 through addition of 5% sodium hydroxide aqueous solution. Thereafter, unreacted monomer was removed by thermal-vacuum distillation. Cooling was subsequently performed to a temperature of 30° C. or lower to yield a water dispersion containing a water-insoluble conjugated diene polymer II (glass-transition temperature Tg: 5° C.) as a binder.

<(22) Production of Silicon Compound X (refer to JP2017-97952A)>

A silicon compound X that was a composite of $Li_4SiO_4$ and $SiO_x$ was produced as follows. First, LiH equivalent to 3 mass % was sufficiently mixed with $SiO_x$ (x=1.5) in an argon atmosphere. Heating was subsequently performed at 800° C. Thereafter, the silicon compound was sufficiently cooled and was washed with alcohol to produce a silicon compound X that was a composite of $Li_4SiO_4$ as a prescribed silicon compound and $SiO_x$ as a silicon-based negative electrode active material. The content ratio (mass %) of the prescribed silicon compound ($Li_4SiO_4$) in the silicon compound X was measured. The measurement result is shown in Tables 1 and 2.

<(23) Production of Silicon Compound Y>

A silicon compound Y that was a composite of $Li_2SiO_3$ and $SiO_x$ was produced as follows. First, LiH equivalent to 1.5 mass % was sufficiently mixed with $SiO_x$ (x=1.5) in an argon atmosphere. Heating was subsequently performed at 700° C. Thereafter, the silicon compound was sufficiently cooled and was washed with alcohol to produce a silicon compound Y that was a composite of $Li_2SiO_3$ as a prescribed silicon compound and $SiO_x$ as a silicon-based negative electrode active material. The content ratio (mass %) of the prescribed silicon compound ($Li_2SiO_3$) in the silicon compound Y was measured. The measurement result is shown in Tables 1 and 2.

Example 1

<Production of Positive Electrode>

A slurry composition for a positive electrode mixed material layer was produced by adding 96.0 parts of a lithium transition metal complex oxide-based material ($LiN_{1/3}Co_{1/3}Mn_{1/3}O_2$) as a positive electrode active material, 2.0 parts of acetylene black (produced by Denka Company Limited; product name: HS-100) as a conductive material, and 2.0 parts of PVdF as a binder into a planetary mixer, adding N-methyl-2-pyrrolidone (NMP) as a dispersion medium to adjust the total solid content concentration to 67%, and mixing these materials.

Next, the obtained slurry composition for a positive electrode mixed material layer was applied onto aluminum foil (thickness: 20 μm) serving as a current collector by a comma coater such as to have a coating weight of 20±0.5 mg/cm$^2$.

The slurry composition on the aluminum foil was dried by conveying the aluminum foil inside a 90° C. oven for 4 minutes and inside a 120° C. oven for 4 minutes at a speed of 300 mm/min to obtain a positive electrode web including a positive electrode mixed material layer formed on the current collector.

The positive electrode mixed material layer side of the produced positive electrode web was subsequently roll pressed with a line pressure of 14 t (tons) in an environment having a temperature of 25±3° C. to obtain a positive electrode having a positive electrode mixed material layer density of 3.20 g/cm$^3$.

<Production of Negative Electrode>

A planetary mixer was charged with 100.0 parts of artificial graphite (MAG-E produced by Hitachi Chemical Co., Ltd.) and 20.0 parts of the silicon compound X as negative electrode active materials, and 1.5 parts of the water-soluble polymer A and 1.0 parts in terms of solid content of carboxymethyl cellulose (BSH-12 produced by DKS Co., Ltd.; degree of etherification: 0.7) as binders. These materials were diluted to a solid content concentration of 60% with deionized water and were then kneaded at a rotation speed of 45 rpm for 60 minutes. Thereafter, 1.0 parts in terms of solid content of the water-insoluble conjugated diene polymer I as a binder was added, and a further 40 minutes of kneading was performed at a rotation speed of 40 rpm. The viscosity was adjusted to 3,000±500 mPa·s (measured by B-type viscometer at 25° C. and 60 rpm) through addition of deionized water and a further 10 minutes of kneading was performed at a rotation speed of 40 rpm.

Thereafter, a 10% aqueous solution of LiOH was used to adjust the pH of the slurry to 10.8 and thereby produce a slurry composition for a negative electrode mixed material layer.

The slurry composition for a negative electrode mixed material layer was then applied onto the surface of copper foil (thickness: 15 μm) serving as a current collector by a comma coater such as to have a coating weight of 7.0±0.5 mg/cm$^2$.

The copper foil having the slurry composition for a negative electrode mixed material layer applied thereon was subsequently conveyed inside an 80° C. oven for 2 minutes and inside a 110° C. oven for 2 minutes at a speed of 500 mm/min to dry the slurry composition on the copper foil and thereby obtain a negative electrode web including a negative electrode mixed material layer formed on the current collector.

The negative electrode mixed material layer side of the produced negative electrode web was subsequently roll pressed with a line pressure of 11 t (tons) in an environment having a temperature of 25±3° C. to obtain a negative electrode having a negative electrode mixed material layer density of 1.65 g/cm$^3$. Thereafter, the negative electrode was left in an environment having a temperature of 25±3° C. and a relative humidity of 50±5% for 1 week. The negative electrode that had been left was used in evaluation of (i) adhesiveness (peel strength) of a negative electrode (negative electrode mixed material layer) and (ii) flexibility (pliability) of a negative electrode. The results are shown in Table 1.

<Preparation of Separator>

Celgard 2500 made of polypropylene was used as a separator.

<Production of Secondary Battery>

A wound cell (discharge capacity equivalent to 700 mAh) was produced using the negative electrode, the positive electrode, and the separator described above and was placed inside aluminum packing. The inside of the aluminum packing was subsequently filled with a $LiPF_6$ solution of 1.0 M in concentration (solvent: mixed solvent of ethylene carbonate (EC)/diethyl carbonate (DEC)=3/7 (volume ratio); additive: containing 2 volume % (solvent ratio) of vinylene carbonate) as an electrolyte solution. The aluminum packing was then closed by heat sealing at a temperature of 150° C. to tightly seal an opening of the aluminum packing, and thereby produce a lithium ion secondary battery. The lithium ion secondary battery was used in evaluation of (iii) rate characteristics of a secondary battery and (iv) cycle characteristics of a secondary battery. The results are shown in Table 1.

Example 2

Production of a positive electrode, production of a negative electrode, preparation of a separator, and production of a secondary battery were performed in the same way as in Example 1 with the exception that instead of producing the negative electrode using the silicon compound X in Example 1, the negative electrode was produced using the silicon compound Y. The results are shown in Table 1.

Example 3

Production of a positive electrode, production of a negative electrode, preparation of a separator, and production of a secondary battery were performed in the same way as in Example 1 with the exception that instead of producing the negative electrode using the water-soluble polymer A in Example 1, the negative electrode was produced using the water-soluble polymer B. The results are shown in Table 1.

Example 4

Production of a positive electrode, production of a negative electrode, preparation of a separator, and production of a secondary battery were performed in the same way as in Example 1 with the exception that instead of producing the negative electrode using the water-soluble polymer A in Example 1, the negative electrode was produced using the water-soluble polymer C. The results are shown in Table 1.

Example 5

Production of a positive electrode, production of a negative electrode, preparation of a separator, and production of a secondary battery were performed in the same way as in Example 1 with the exception that instead of producing the negative electrode using the water-soluble polymer A in Example 1, the negative electrode was produced using the water-soluble polymer D. The results are shown in Table 1.

Example 6

Production of a positive electrode, production of a negative electrode, preparation of a separator, and production of a secondary battery were performed in the same way as in Example 1 with the exception that instead of producing the negative electrode using the water-soluble polymer A in Example 1, the negative electrode was produced using the water-soluble polymer E. The results are shown in Table 1.

Example 7

Production of a positive electrode, production of a negative electrode, preparation of a separator, and production of a secondary battery were performed in the same way as in Example 1 with the exception that instead of producing the negative electrode using the water-soluble polymer A in Example 1, the negative electrode was produced using the water-soluble polymer F. The results are shown in Table 1.

Example 8

Production of a positive electrode, production of a negative electrode, preparation of a separator, and production of a secondary battery were performed in the same way as in Example 1 with the exception that instead of producing the negative electrode using the water-insoluble conjugated diene polymer I in Example 1, the negative electrode was produced using the water-insoluble conjugated diene polymer II. The results are shown in Table 1.

Example 9

Production of a positive electrode, production of a negative electrode, preparation of a separator, and production of a secondary battery were performed in the same way as in Example 1 with the exception that instead of producing the negative electrode with a slurry pH of 10.8 in Example 1, the slurry pH was adjusted to 12 using lithium hydroxide and then the negative electrode was produced. The results are shown in Table 1.

Example 10

Production of a positive electrode, production of a negative electrode, preparation of a separator, and production of a secondary battery were performed in the same way as in Example 1 with the exception that instead of producing the negative electrode using the water-soluble polymer A in Example 1, the negative electrode was produced using the water-soluble polymer G. The results are shown in Table 1.

Example 11

Production of a positive electrode, production of a negative electrode, preparation of a separator, and production of a secondary battery were performed in the same way as in Example 1 with the exception that instead of producing the negative electrode using the water-soluble polymer A in Example 1, the negative electrode was produced using the water-soluble polymer H. The results are shown in Table 1.

Example 12

Production of a positive electrode, production of a negative electrode, preparation of a separator, and production of a secondary battery were performed in the same way as in Example 1 with the exception that instead of producing the negative electrode using carboxymethyl cellulose in Example 1, the negative electrode was produced without using carboxymethyl cellulose. The results are shown in Table 1.

Example 13

Production of a positive electrode, production of a negative electrode, preparation of a separator, and production of a secondary battery were performed in the same way as in Example 1 with the exception that instead of producing the negative electrode using the water-insoluble conjugated diene polymer I in Example 1, the negative electrode was produced without using the water-insoluble conjugated diene polymer I. The results are shown in Table 1.

Comparative Example 1

Production of a positive electrode, production of a negative electrode, preparation of a separator, and production of a secondary battery were performed in the same way as in Example 1 with the exception that instead of producing the negative electrode using the water-soluble polymer A in Example 1, the negative electrode was produced using the water-soluble polymer I. The results are shown in Table 2.

Comparative Example 2

Production of a positive electrode, production of a negative electrode, preparation of a separator, and production of a secondary battery were performed in the same way as in Example 1 with the exception that instead of producing the negative electrode using the water-soluble polymer A in Example 1, the negative electrode was produced using the water-soluble polymer J. The results are shown in Table 2.

Comparative Example 3

Production of a positive electrode, production of a negative electrode, preparation of a separator, and production of a secondary battery were performed in the same way as in Example 1 with the exception that instead of producing the negative electrode with a slurry pH of 10.8 in Example 1, the slurry pH was adjusted to 8.5 using acetic acid and then the negative electrode was produced. The results are shown in Table 2.

TABLE 1

| | | Example 1 | Example 2 | Example 3 | Example 4 | Example 5 | Example 6 | Example 7 |
|---|---|---|---|---|---|---|---|---|
| Graphite particles | Content (parts) | 100 | 100 | 100 | 100 | 100 | 100 | 100 |
| Silicon compound | Content (parts) | 20 | 20 | 20 | 20 | 20 | 20 | 20 |
| | Content ratio of prescribed silicon compound in silicon compound (mass %) | 5 | 5 | 5 | 5 | 5 | 5 | 5 |

TABLE 1-continued

| | | | | Example (cont.) | | | | | | |
|---|---|---|---|---|---|---|---|---|---|---|
| Binder | Water-soluble polymer | Type of prescribed silicon compound | | $Li_4SiO_4$ | $Li_2SiO_3$ | $Li_4SiO_4$ | $Li_4SiO_4$ | $Li_4SiO_4$ | $Li_4SiO_4$ | $Li_4SiO_4$ |
| | | Content (parts) | | 1.5 | 1.5 | 1.5 | 1.5 | 1.5 | 1.5 | 1.5 |
| | | Monomer forming ethylenically unsaturated carboxylic acid monomer unit A | Type | AA | AA | AA | AA | AA | AA | AA |
| | | | Akali metal salt | Li | Li | Li | Li | Li | Li | Li |
| | | | Proportion constituted among all monomer units (mass %) | 30 | 30 | 30 | 30 | 30 | 30 | 80 |
| | | Monomer forming cross-linkable monomer unit B | Type | FAM-402 | FAM-402 | AMA | P-30 | FAM-402 | FAM-402 | FAM-402 |
| | | | No. of polymerizable unsaturated groups | 4 | 4 | 2 | 3 | 4 | 4 | 4 |
| | | | Proportion constituted among all monomer units (mass %) | 1 | 1 | 1 | 1 | 0.2 | 1 | 1 |
| | | Monomer forming ethylenically unsaturated monomer unit C | Type | Aam | Aam | Aam | Aam | Aam | β-HEA | Aam |
| | | | Proportion constituted among all monomer units (mass %) | 69 | 69 | 69 | 69 | 69.8 | 69 | 19 |
| | | Viscosity of 1 mass % aqueous solution (mPa·s) | | 250 | 250 | 550 | 400 | 80 | 550 | 30 |
| | | Weight-average molecular weight (×10⁴) | | 700 | 700 | 1100 | 850 | 350 | 1600 | 100 |
| | | Degree of swelling in electrolyte solution (%) | | 105 | 105 | 109 | 108 | 105 | 115 | 105 |
| | Water-insoluble conjugated diene copolymer | Content (parts) | | 1 | 1 | 1 | 1 | 1 | 1 | 1 |
| | | Tg (° C.) | | 25 | 25 | 25 | 25 | 25 | 25 | 25 |
| | CMC | Content (parts) | | 1 | 1 | 1 | 1 | 1 | 1 | 1 |
| Slurry pH | | | | 10.8 | 10.8 | 10.8 | 10.8 | 10.8 | 10.8 | 10.8 |
| Evaluation | (i) Adhesiveness (peel strength) of negative electrode (negative electrode mixed material layer) | | | A | A | C | B | B | B | B |
| | (ii) Flexibility (pliability) of negative electrode | | | A | A | B | B | A | B | A |
| | (iii) Rate characteristics of secondary battery | | | A | B | B | B | A | B | A |
| | (iv) Cycle characteristics of secondary battery | | | A | A | B | B | B | C | C |

| | | | | Example 8 | Example 9 | Example 10 | Example 11 | Example 12 | Example 13 |
|---|---|---|---|---|---|---|---|---|---|
| Graphite particles | Content (parts) | | | 100 | 100 | 100 | 100 | 100 | 100 |
| Silicon compound | Content (parts) | | | 20 | 20 | 20 | 20 | 20 | 20 |
| | Content ratio of prescribed silicon compound in silicon compound (mass %) | | | 5 | 5 | 5 | 5 | 5 | 5 |
| | Type of prescribed silicon compound | | | $Li_4SiO_4$ | $Li_4SiO_4$ | $Li_4SiO_4$ | $Li_4SiO_4$ | $Li_4SiO_4$ | $Li_4SiO_4$ |
| Binder | Water-soluble polymer | Content (parts) | | 1.5 | 1.5 | 1.5 | 1.5 | 1.5 | 1.5 |
| | | Monomer forming ethylenically unsaturated carboxylic acid monomer unit A | Type | AA | AA | MAA | AA | AA | AA |
| | | | Akali metal salt | Li | Li | Li | K | Li | Li |
| | | | Proportion constituted among all monomer units (mass %) | 30 | 30 | 30 | 30 | 30 | 30 |
| | | Monomer forming cross-linkable monomer unit B | Type | FAM-402 | FAM-402 | FAM-402 | FAM-402 | FAM-402 | FAM-402 |
| | | | No. of polymerizable unsaturated groups | 4 | 4 | 4 | 4 | 4 | 4 |
| | | | Proportion constituted among all monomer units (mass %) | 1 | 1 | 1 | 1 | 1 | 1 |
| | | Monomer forming ethylenically unsaturated monomer unit C | Type | Aam | Aam | Aam | Aam | Aam | Aam |
| | | | Proportion constituted among all monomer units (mass %) | 69 | 69 | 69 | 69 | 69 | 69 |
| | | Viscosity of 1 mass % aqueous solution (mPa·s) | | 250 | 250 | 130 | 230 | 250 | 250 |
| | | Weight-average molecular weight (×10⁴) | | 700 | 700 | 550 | 700 | 700 | 700 |
| | | Degree of swelling in electrolyte solution (%) | | 105 | 109 | 107 | 105 | 105 | 105 |
| | Water-insoluble conjugated diene copolymer | Content (parts) | | 1 | 1 | 1 | 1 | 1 | 0 |
| | | Tg (° C.) | | 5 | 25 | 25 | 25 | 25 | 25 |
| | CMC | Content (parts) | | 1 | 1 | 1 | 1 | 0 | 1 |
| Slurry pH | | | | 10.8 | 12 | 10.8 | 10.8 | 10.8 | 10.8 |
| Evaluation | (i) Adhesiveness (peel strength) of negative electrode (negative electrode mixed material layer) | | | A | B | B | A | C | C |
| | (ii) Flexibility (pliability) of negative electrode | | | A | A | A | A | A | A |
| | (iii) Rate characteristics of secondary battery | | | A | A | A | C | A | A |
| | (iv) Cycle characteristics of secondary battery | | | C | A | A | A | A | B |

TABLE 2

|  |  |  |  | Comparative Example 1 | Comparative Example 2 | Comparative Example 3 |
|---|---|---|---|---|---|---|
| Graphite particles | Content (parts) |  |  | 100 | 100 | 100 |
| Silicon compound | Content (parts) |  |  | 20 | 20 | 20 |
|  | Content ratio of prescribed silicon compound in silicon compound (mass %) |  |  | 5 | 5 | 5 |
|  | Type of prescribed silicon compound |  |  | $Li_4SiO_4$ | $Li_4SiO_4$ | $Li_4SiO_4$ |
| Binder | Water-soluble polymer | Content (parts) |  | 1.5 | 1.5 | 1.5 |
|  |  | Monomer forming ethylenically unsaturated carboxylic acid monomer unit A | Type | AA | AA | AA |
|  |  |  | Alkali metal salt | Li | Li | Li |
|  |  |  | Proportion constituted among all monomer units (mass %) | 30 | 30 | 30 |
|  |  | Monomer forming cross-linkable monomer unit B | Type | — | FAM-402 | FAM-402 |
|  |  |  | No. of polymerizable unsaturated groups | — | 4 | 4 |
|  |  |  | Proportion constituted among all monomer units (mass %) | — | 1 | 1 |
|  |  | Monomer forming ethylenically unsaturated monomer unit C | Type | Aam | Aam | Aam |
|  |  |  | Proportion constituted among all monomer units (mass %) | 70 | 69 | 69 |
|  |  | Viscosity of 1 mass % aqueous solution (mPa·s) |  | 200 | 1500 | 250 |
|  |  | Weight-average molecular weight (×10⁴) |  | 650 | 2000 | 700 |
|  |  | Degree of swelling in electrolyte solution (%) |  | 103 | 105 | 105 |
|  | Water-insoluble conjugated diene copolymer | Content (parts) |  | 1 | 1 | 1 |
|  |  | Tg (° C.) |  | 25 | 25 | 25 |
|  | CMC | Content (parts) |  | 1 | 1 | 1 |
| Slurry pH |  |  |  | 10.8 | 10.8 | 8.5 |
| Evaluation | (i) Adhesiveness (peel strength) of negative electrode (negative electrode mixed material layer) |  |  | D | B | D |
|  | (ii) Flexibility (pliability) negative electrode |  |  | C | D | B |
|  | (iii) Rate characteristics of secondary battery |  |  | D | D | B |
|  | (iv) Cycle characteristics of secondary battery |  |  | C | C | D |

In Tables 1 and 2, the following notations are as shown below.
AA: Acrylic acid
MAA: Methacrylic acid
Aam: Acrylamide
FAM-402: N,N,N,N-Tetraacryloyltriethylenetetramine (acryloyl group-containing monomer)
P-30: Pentaerythritol triallyl ether (allyl group-containing monomer)
AMA: Allyl methacrylate (allyl group-containing monomer; methacrylic acid ester)
β-HEA: β-Hydroxyethyl acrylate It can be seen from Tables 1 and 2 that the slurry compositions for a lithium ion secondary battery of Examples 1 to 13, which each contain a specific silicon compound and a binder including a specific water-soluble polymer and have a pH of not lower than 9 and not higher than 12, can cause an electrode for a lithium ion secondary battery to display excellent adhesiveness (peel strength) and flexibility (pliability) and can cause a lithium ion secondary battery to display excellent rate characteristics and cycle characteristics compared to the slurry compositions for a lithium ion secondary battery of Comparative Examples 1 and 2, which do not contain a binder including a specific water-soluble polymer, and the slurry composition for a lithium ion secondary battery of Comparative Example 3, which does not have a pH of not lower than 9 and not higher than 12 (i.e., has a pH of 8.5).

INDUSTRIAL APPLICABILITY

According to the present disclosure, it is possible to provide a slurry composition for a lithium ion secondary battery that can cause an electrode for a lithium ion secondary battery to display excellent adhesiveness (peel strength) and flexibility (pliability) and that can cause a lithium ion secondary battery to display excellent rate characteristics and cycle characteristics.

Moreover, according to the present disclosure, it is possible to provide an electrode for a lithium ion secondary battery that can display excellent adhesiveness (peel strength) and flexibility (pliability) and that can cause a lithium ion secondary battery to display excellent rate characteristics and cycle characteristics.

The invention claimed is:

1. An anode active material slurry composition comprising an active material comprising a silicon compound and a carbon-based active material, a binder and water, wherein
the silicon compound includes either or both of $LizSiO_3$ and $LiSiO_4$, wherein total content of $Li_2SiO_3$ and $Li_4SiO_4$ in the silicon compound is 3 mass % or more and 15 mass % or less,
the binder includes a water-soluble polymer,
the water-soluble polymer includes either or both of an ethylenically unsaturated carboxylic acid monomer unit (A) and an alkali metal salt thereof, and includes a cross-linkable monomer unit (B) and an ethylenically unsaturated monomer unit (C),
the ethylenically unsaturated carboxylic acid monomer unit (A) is formed from only at least one ethylenically unsaturated carboxylic acid monomer selected from the group consisting of acrylic acid, methacrylic acid, itaconic acid, maleic acid, fumaric acid, and crotonic acid,
the cross-linkable monomer unit (B) is formed from only at least one cross-linkable monomer selected from the group consisting of N,N,N,N-tetraacryloyltriethylenetetramine and N,N-diacryloyl-4,7,10-trioxa-1,13-tridecanediamine, the ethylenically unsaturated monomer unit (C) is formed from only at least one ethylenically unsaturated monomer selected from the group consisting of acrylamide, β-hydroxyethyl acrylate, β-hydroxyethyl methacrylate, hydroxyethyl acrylamide, acrylonitrile, methoxyethyl acrylate, N-vinyl-2-pyrrolidone, and diethylacrylamide, a content ratio of the ethylenically unsaturated carboxylic acid monomer unit (A) relative to all monomer units in the water-soluble polymer is 10 mass % or more and 95 mass % or less, a content ratio of the cross-linkable monomer unit (B) relative to all monomer units in the water-soluble polymer is 0.01 mass % or more and 10 mass % or less, a content ratio of the ethylenically unsaturated monomer unit (C) relative to all monomer units in the water-soluble polymer is 5 mass % or more and 90 mass % or less, a 1 mass % aqueous solution of the water-soluble polymer has a viscosity of 10 mPa·s or more and 1,000 mPa·s or less, and the slurry composition for a lithium ion secondary battery has a pH of not lower than 9 and not higher than 12.

2. The anode active material slurry composition according to claim 1, wherein the binder-further includes comprises carboxymethyl cellulose.

3. The anode active material slurry composition according to claim 1, wherein the water-soluble polymer has a weight-average molecular weight of not less than 300,000 and not more than 15,000,000.

4. The anode active material slurry composition according to claim 1, wherein the water-soluble polymer has a degree of swelling in electrolyte solution of 100% or more and less than 120%.

5. The anode active material slurry composition according to claim 1, wherein the binder further includes a water-insoluble conjugated diene copolymer, wherein a content of the water-insoluble conjugated diene copolymer per 100 parts by mass of slurry solid content is 0.1 parts by mass or more and 2.5 parts by mass or less, and the water-insoluble conjugated diene copolymer includes a conjugated diene monomer unit, an aromatic vinyl monomer unit, and an ethylenically unsaturated carboxylic acid monomer unit, and has a glass-transition temperature of 0° C. or higher and 50° C. or lower, the conjugated diene monomer unit is formed from only at least one conjugated diene monomer selected from the group consisting of 1,3-butadiene, 2-methyl-1,3-butadiene, 2,3-dimethyl-1,3-butadiene, 1,3-pentadiene, and isoprene, the aromatic vinyl monomer unit formed from only at least one aromatic vinyl monomer selected from the group consisting of styrene, cx-methylstyrene, vinyltoluene, 2-vinylnaphthalene, vinylpyridine, and divinylbenzene, the ethylenically unsaturated carboxylic acid monomer unit formed from only at least one ethylenically unsaturated carboxylic acid monomer selected from the group consisting of itaconic acid, acrylic acid, methacrylic acid, maleic acid, fumaric acid, and crotonic acid, a content ratio of the conjugated diene monomer unit relative to all monomer units in the water-insoluble conjugated diene copolymer is 10 mass % or more and 80 mass % or less, a content ratio of the aromatic vinyl monomer unit relative to all monomer units in the water-insoluble conjugated diene copolymer is 20 mass % or more and 80 mass % or less, a content ratio of the ethylenically unsaturated carboxylic acid monomer unit relative to all monomer units in the water-insoluble conjugated diene copolymer is 0.1 mass % or more and 20 mass % or less.

6. An anode for a lithium ion secondary battery comprising an electrode mixed material layer formed using the anode active material slurry composition for a lithium ion secondary battery according to claim 1.

* * * * *